United States Patent
Wagner et al.

(10) Patent No.: US 9,747,516 B2
(45) Date of Patent: Aug. 29, 2017

(54) KEYPOINT DETECTION WITH TRACKABILITY MEASUREMENTS

(71) Applicant: QUALCOMM Incorporated, San Diego, CA (US)

(72) Inventors: Daniel Wagner, Vienna (AT); Kiyoung Kim, Vienna (AT)

(73) Assignee: QUALCOMM Incorporated, San Diego, CA (US)

(*) Notice: Subject to any disclaimer, the term of this patent is extended or adjusted under 35 U.S.C. 154(b) by 1 day.

(21) Appl. No.: 14/846,674

(22) Filed: Sep. 4, 2015

(65) Prior Publication Data

US 2016/0335519 A1   Nov. 17, 2016

Related U.S. Application Data

(60) Provisional application No. 62/160,420, filed on May 12, 2015.

(51) Int. Cl.
| | |
|---|---|
| *G06K 9/46* | (2006.01) |
| *G06K 9/62* | (2006.01) |
| *G06K 9/52* | (2006.01) |
| *G06T 3/00* | (2006.01) |
| *G06T 7/20* | (2017.01) |
| *G06K 9/32* | (2006.01) |

(52) U.S. Cl.
CPC ............ *G06K 9/4671* (2013.01); *G06K 9/52* (2013.01); *G06K 9/6211* (2013.01); *G06K 9/6215* (2013.01); *G06T 3/0093* (2013.01); *G06T 7/20* (2013.01); *G06K 2009/3291* (2013.01); *G06K 2009/4666* (2013.01); *G06T 2207/20048* (2013.01)

(58) Field of Classification Search
None
See application file for complete search history.

(56) References Cited

U.S. PATENT DOCUMENTS

| | | | |
|---|---|---|---|
| 8,582,821 B1* | 11/2013 | Feldman | G06T 7/204 |
| | | | 348/169 |
| 8,705,876 B2 | 4/2014 | Vaddadi et al. | |
| 8,755,837 B2 | 6/2014 | Rhoads et al. | |
| 2014/0334668 A1 | 11/2014 | Saund | |

(Continued)

FOREIGN PATENT DOCUMENTS

WO   2008143523 A1   11/2008

OTHER PUBLICATIONS

Computer Vision, Chapter 4, Robert Szeliski. 2011.*

(Continued)

*Primary Examiner* — Delomia L Gilliard
(74) *Attorney, Agent, or Firm* — Silicon Valley Patent Group LLP

(57) ABSTRACT

Disclosed embodiments facilitate keypoint selection in part by assigning a similarity score to each candidate keypoint being considered for selection. The similarity score may be based on the maximum measured similarity of an image patch associated with a keypoint in relation to an image patch in a local image section in a region around the image patch. A subset of the candidate keypoints with the lowest similarity scores may be selected and used to detect and/or track objects in subsequent images and/or to determine camera pose.

30 Claims, 10 Drawing Sheets

(56) References Cited

U.S. PATENT DOCUMENTS

2014/0350839 A1  11/2014 Pack et al.

OTHER PUBLICATIONS

International Search Report and Written Opinion—PCT/US2016/029843—ISA/EPO—dated Jun. 24, 2016.
Lowe D.G., "Distinctive image features from scale-invariant key points," International Journal of Computer Vision, 2004, vol. 60, No. 2, pp. 91-110.
Szeliski R., "Computer Vision", Jan. 1, 2011 (Jan. 1, 2011), Springer, London, 54 Pages, XP055281137, ISBN: 978-1-84882-934-3, DOI: 10.1007/978-1-84882-935-0.
Written Opinion of the IPEA—PCT/US2016/029843—ISA/EPO—dated Mar. 30, 2017.
Chuang Y-Y., et al., "Features", Digital Visual Effects, Mar. 20, 2007 (Mar. 20, 2007), XP055358444, Retrieved from the Internet: URL: http://www.csie.ntu.edu.tw/-cyy/courses/vfx/07spring/lectures/handoutsllec04_feature_4up.pdf.

* cited by examiner

KEYPOINT DETECTION WITH TRACKABILITY MEASUREMENTS

CROSS REFERENCE TO RELATED APPLICATIONS

This application claims the benefit of and priority to U.S. Provisional Application No. 62/160,420 entitled "Keypoint Detection with Trackability Measurements," filed May 12, 2015, which is incorporated by reference in its entirety herein.

FIELD

This disclosure relates generally to apparatus and methods for object detection and tracking in an image sequence.

BACKGROUND

In computer vision and computer graphics, object tracking and/or recognition is frequently performed to facilitate various applications. For example, mapping or navigation applications may use recognized objects in a camera's field of view to determine the location of an object and perform course corrections. As another example, augmented reality (AR) applications may augment real world images based on the positions and orientations of one or more objects in captured images.

In object detection or tracking applications, one or more keypoints or other salient features may be identified in one or more images. Typically, corner points, points with high contrast, high intensity, etc are favored for selection as keypoints. Once identified, the keypoints are then tracked across several frames of an image sequence to determine a pose (position and orientation) of the camera relative to the tracked object. Objects may be added, removed and/or altered in the image based on camera pose. Realism in the AR images, for example, may be enhanced when camera pose is accurately estimated. Keypoint based tracking assumes that one or more keypoints in a current image can be reliably tracked across several image frames. However, if an image includes a plurality of similar keypoints that are proximate to each other, ambiguity may arise during tracking because of inaccuracies in establishing correspondences between keypoints in one image and corresponding points in another image. Keypoint mismatches can lead to pose drift, image artifacts, etc thereby detracting from user experience.

Moreover, in many conventional approaches, the number of keypoints tracked may be relatively large. However, a larger number of keypoints is not necessarily a guarantor of tracking accuracy. For example, tracking accuracy may not be increased if proximate keypoints exhibit relatively high degrees of similarity. In addition, when a larger number of keypoints is used, as in many conventional schemes, computational overhead may be increased, performance and/or application response times may be sub-optimal, and power consumption may be increased—without achieving a concomitant increase in tracking accuracy.

SUMMARY

According to some aspects, disclosed is a method comprising: determining a set of candidate keypoints based on a first image captured with a camera; determining, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in a region around the image patch; and selecting a first subset of the candidate keypoints, wherein the first subset comprises a predefined number of candidate keypoints with lowest similarity scores.

In another aspect, disclosed embodiments pertain to a Mobile Station (MS), which may comprise: a camera to capture a plurality of images comprising a first image; a memory to store the plurality of images; and a processor coupled to the camera and the memory. In some embodiments, the processor may be configured to: determine a set of candidate keypoints based on the first image captured with a camera; determine, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in a region around the image patch; and select a first subset of the candidate keypoints, wherein the first subset comprises a predefined number of candidate keypoints with lowest similarity scores.

In a further aspect, an apparatus may comprise: image sensing means to capture a plurality of images comprising a first image; means for determining a set of candidate keypoints based on a first image captured by an image sensing means; means for determining, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in a region around the image patch; and means for selecting a first subset of the candidate keypoints, wherein the first subset comprises a predefined number of candidate keypoints with lowest similarity scores.

In some embodiments, a non-transitory computer-readable medium may comprise instructions, which when executed by a Mobile Station (MS) comprising a camera, cause the MS to perform steps in a method comprising: determining a set of candidate keypoints based on a first image captured with a camera; determining, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in a region around the image patch; and selecting a first subset of the candidate keypoints, wherein the first subset comprises a predefined number of candidate keypoints with lowest similarity scores.

Embodiments disclosed also relate to software, firmware, and program instructions created, stored, accessed, or modified by processors using computer readable media or computer-readable memory. The methods described may be performed on processors, servers, various computing and mobile devices including wearable and head mounted devices and/or combinations thereof.

These and other embodiments are further explained below with respect to the following figures. It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

DETAILED DESCRIPTION

Figure 1:
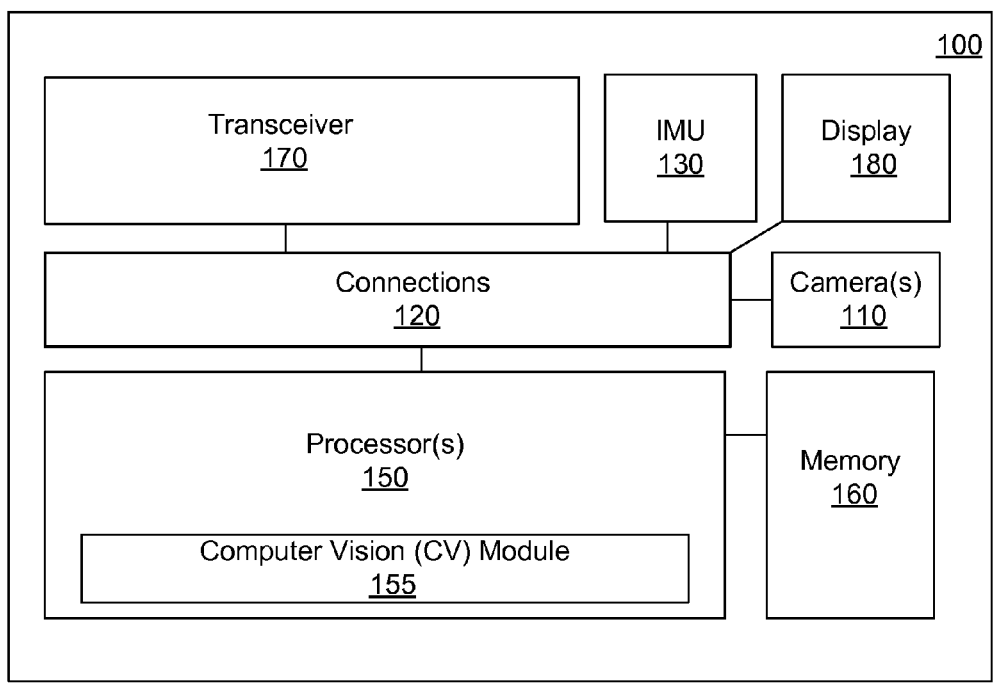
FIG. 1 shows a block diagram of an exemplary Mobile Station (MS) capable of performing keypoint detection and tracking in a manner consistent with disclosed embodiments.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The term "detection" refers to the process of localizing a target in a captured image frame and computing a camera pose with respect to the object. The term "tracking" refers to camera pose estimation relative to the target over a temporal sequence of image frames. Traditional keypoint based detection and tracking techniques assume that corner points, high contrast points etc. (which may, for example, be associated with an object of interest) in one image can be reliably detected and tracked in subsequent image frames. Thus, when selecting keypoints in an image, traditional keypoint based detection and tracking techniques ignore the distinctiveness or uniqueness of the selected keypoints relative to other sections of the same image. Consequently, when an image includes a plurality of similar keypoints, such as, for example, several similar corner points in close proximity, ambiguities can arise during tracking because it may be difficult to establish correspondences between keypoints in one image and similar points in another image. Keypoint mismatches can lead to pose drift, image artifacts, etc. thereby detracting from user experience.

Disclosed embodiments facilitate keypoint selection in part by assigning a similarity score (and/or a trackability score) to each likely keypoint being considered for selection. The similarity score may be based on the similarity of an image patch associated with a keypoint to a local image section in the vicinity of the keypoint. The term "image patch" is used to refer to an area such as a polygon, circle, or other region around a keypoint. In some embodiments, the similarity score may be based, in part, on the maximum measured similarity of the image patch associated with a keypoint to an image patch in a local image section around the image patch. Further, in some embodiments, a higher maximum measured similarity may be associated with a lower "trackability" score or measure. Thus, the trackability score for a keypoint may vary inversely (with high similarity implying a low trackability score and low similarity implying a high trackability score) in relation to the maximum measured similarity of the keypoint relative to an image patch in the vicinity of the keypoint. In some embodiments, a set of keypoints with the lowest similarity scores (or highest trackability scores) of the candidate keypoints may be selected from among the likely keypoints. The selected keypoints may be used to detect and/or track objects in subsequent images and/or to determine camera pose relative to the images.

In some instances, tracking may be based on a hierarchy or pyramid of images of different resolutions. For example, a captured image keyframe may be subsampled to obtain a hierarchy of images of differing resolutions that are associated with the captured keyframe. Lower resolution images facilitate tracking in the event of large camera movements. The images of differing resolutions may be viewed as constituting a pyramid where each level of the pyramid includes images differing in resolution by some factor from an immediately higher or lower level of the image pyramid. For example, the highest level (level 0) of the pyramid may have the raw or highest resolution image and each level below may downsample the image relative to the level immediately above by some factor. For example, for an image $I_0$ of size 640×480 (at level 0), the images $I_3$, $I_2$, $I_3$ and $I_4$ may be of sizes 320×240, 160×120, 80×60 and 40×30, respectively, where the subscript indicates the image level in the image pyramid. Thus, each keypoint in a keyframe in the image pyramid may be associated with: (i) its source keyframe, (ii) one of the subsampled images associated with the source keyframe and (iii) a pixel location within the source or subsampled image keyframes.

In some embodiments, the keypoint similarity determination may be extended to keyframes in the image pyramid. Accordingly, in some embodiments, a similarity (and/or trackability) score may be assigned to candidate keypoints in or more images in the image pyramid. For each image in the image pyramid, a similarity score may be assigned to candidate keypoints based on the similarity of an image patch associated with a keypoint in that image to a local image section around the image patch. In some embodiments, the similarity scoring may be applied to images at each level of the image pyramid and, at each level, keypoints with the lowest similarity (or highest trackability) scores may be selected. In some embodiments, the image patch associated with a keypoint may be artificially blurred to increase tracking robustness when blurred images are encountered. In some embodiments, tracking module simplicity and keypoint matching robustness may be enhanced because portions of the keypoint selection process may also be used for keypoint matching.

FIG. 1 shows a block diagram of an exemplary Mobile Station (MS) 100 capable of performing keypoint based detection and tracking in a manner consistent with disclosed embodiments. As used herein, mobile device or mobile station (MS) 100, may take the form of a cellular phone, mobile phone, or other wireless communication device, a personal communication system (PCS) device, personal navigation device (PND), Personal Information Manager (PIM), or a Personal Digital Assistant (PDA), a laptop, tablet, notebook, handheld computer and/or a wearable computing device, including head mounted devices or devices with head mounted displays. The terms "mobile device" or "mobile station" are used interchangeably herein. In some embodiments, MS 100 may be capable of receiving wireless communication and/or navigation signals.

Further, the term "mobile station" is also intended to include devices which communicate with a personal navigation device (PND), such as by short-range wireless, infrared, wireline connection, or other connections and/or position-related processing occurs at the device or at the PND. Also, "mobile station" is intended to include all devices, including various wireless communication devices, which are capable of communication with a server, regardless of whether wireless signal reception, assistance data reception, and/or related processing occurs at the device, at a server, or at another device associated with the network. Any operable combination of the above are also considered a "mobile station."

The term "mobile station" is also intended to include gaming or other devices that may not be configured to connect to a network or to otherwise communicate, either wirelessly or over a wired connection, with another device. For example, a "mobile station" may omit communication elements and/or networking functionality. For example, embodiments described herein may be implemented in a standalone device that is not configured to connect for wired or wireless networking with another device.

As shown in FIG. 1, MS 100 may include cameras 110, Inertial Measurement Unit (IMU) 130, processors 150, memory 160 and/or transceiver 170, display/screen 180 which may be operatively coupled to each other and to other functional blocks (not shown) on MS 110 through connections 120. Connections 120 may comprise buses, lines, fibers, links, etc., or some combination thereof.

Transceiver 170 may, for example, include a transmitter enabled to transmit one or more signals over one or more types of wireless communication networks and a receiver to receive one or more signals transmitted over the one or more types of wireless communication networks. Transceiver 170 may permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, etc, and/or Wireless Wide Area Networks (WWANs) such as LTE, WiMAX, etc. MS 100 may also include one or more ports for communicating over wired networks.

In some embodiments, MS 100 may comprise image sensors such as CCD or CMOS sensors and/or cameras 110, which are hereinafter referred to as "cameras 110". Cameras 110 may convert an optical image into an electronic or digital image and may send captured images to processor 150. In general, cameras 110 may be color or grayscale cameras, which provide "color information." In general, as used herein, a color image or color information may be viewed as comprising 1 to N channels, where N is some integer dependent on the color space being used to store the image. For example, an RGB image comprises three channels, with one channel each for Red, Blue and Green information.

In some embodiments, MS 100 may comprise multiple cameras 110, such as dual front cameras and/or a front and rear-facing cameras, which may also incorporate various sensors. In some embodiments, cameras 110 may be capable of capturing both still and video images. In some embodiments, cameras 110 may be RGBD or stereoscopic video cameras capable of capturing images at 30 frames per second (fps). In one embodiment, images captured by cameras 110 may be in a raw uncompressed format and may be compressed prior to being processed and/or stored in memory 160. In some embodiments, image compression may be performed by processors 150 using lossless or lossy compression techniques.

Further, MS 100 may include a screen or display 180 capable of rendering color images, including 3D images. In some embodiments, display 170 may be used to display live images captured by camera 110, Augmented Reality (AR) images, Graphical User Interfaces (GUIs), program output, etc. In some embodiments, display 180 may comprise and/or be housed with a touchscreen to permit users to input data via some combination of virtual keyboards, icons, menus, or other Graphical User Interfaces (GUIs), user gestures and/or input devices such as styli and other writing implements. In some embodiments, display 180 may be implemented using a Liquid Crystal Display (LCD) display or a Light Emitting Diode (LED) display, such as an Organic LED (OLED) display. In other embodiments, display 180 may be a wearable display, which may be operationally coupled to, but housed separately from, other functional units in MS 100. In some embodiments, MS 100 may comprise ports to permit the display of images through a separate monitor coupled to MS 100.

In some embodiments, processors 150 may also receive input from IMU 130. In other embodiments, IMU 130 may comprise 3-axis accelerometer(s), 3-axis gyroscope(s), and/or magnetometer(s). IMU 130 may provide velocity, orientation, and/or other position related information to processor 150. In some embodiments, IMU 130 may output measured information in synchronization with the capture of each image frame by cameras 130. In some embodiments, the output of IMU 130 may be used in part by processor 150 to determine a pose of camera 110 and/or MS 100.

The pose of camera 110 refers to the position and orientation of the camera 110 relative to a frame of reference. In some embodiments, camera pose may be determined for 6-Degrees Of Freedom (6DOF), which refers to three translation components (which may be given by X,Y,Z coordinates of a frame of reference) and three angular components (e.g. roll, pitch and yaw relative to the same frame of reference).

In some embodiments, the 6DoF pose of camera 110 and/or MS 100 may be determined and/or tracked by processor 150 using a visual tracking solution based on images captured by camera 110. For example, a Computer Vision (CV) Module 155 running on processor 150 may implement and execute computer vision based tracking, model-based tracking, and/or Simultaneous Localization And Mapping (SLAM) methods. SLAM refers to a class of techniques where a map of an environment, such as a map of an environment being modeled by MS 100, is created while simultaneously tracking the camera's pose relative to that map. SLAM techniques include Visual SLAM (VLSAM), where images captured by one or more cameras, such as a camera(s) 110 on MS 100, may be used to create a map of an environment while simultaneously tracking the camera's pose relative to that map. VSLAM may thus involve tracking the 6DOF pose of a camera while also determining the 3-D structure of the surrounding environment. For example, in some embodiments, VSLAM techniques may detect salient feature patches (e.g. keypoints) in one or more captured image frames and store the captured imaged frame(s) as a reference frame(s). The pose of the camera may then be determined, for example, by identifying corresponding features in a current image and a reference image.

In some embodiments, CV module 155 may be implemented using software, firmware, and/or circuitry or some combination thereof. The circuitry to implement CV module 155 may include dedicated circuitry such as Application Specific Integrated Circuits (ASICs) or a dedicated processor, and/or configurable circuitry such as Field Programmable Gate Arrays (FPGAs), Digital Signal Processors (DSPs), and/or processor(s) (such as processor(s) 150).

In some embodiments, the methods implemented by CV module 155 may be based on color or grayscale image data captured by cameras 110 and may be used to generate estimates of 6DOF pose measurements of the camera. In some embodiments, the output of IMU 130 may be used to estimate, correct, and/or otherwise adjust the estimated pose. Further, in some embodiments, images captured by cameras 110 may be used to recalibrate or perform bias adjustments for IMU 130.

In some embodiments, camera pose estimation, and/or target detection/tracking in images may be based on keypoints in the images. The term "keypoints" is used to refer to interesting or salient features in an image. In some embodiments, keypoints may be detected in images captured by camera(s) 110 by processor(s) 150 and/or CV module 155. For example, keypoints may be detected using various techniques such as the Harris detector, Difference of Gaussians (DoG), or Features from Accelerated Segment Test ("FAST") or variants thereof.

The Harris Corner Detector provides an efficient method to identify, as keypoints, those pixels in an image with a large difference in intensity relative to nearby pixels in all directions, for some specified displacement. The Shi-Tomasi or Kanade-Tomasi methods build upon the Harris Corner detector.

DoG applies Gaussian blurring to images at two consecutive levels in an image pyramid and obtains the difference of the Gaussian blurred images. Keypoints are identified based on local extrema in the differenced image. An image pyramid, which is described further below, may be obtained by subsampling a first image to obtain a hierarchy of images of differing lower resolutions that are associated with the first/reference image.

The FAST corner detector may use a circle of some number of pixels (e.g. a 16 pixel Bresenham circle of radius 3) to classify whether a candidate point p is actually a keypoint. For example, each pixel in the circle may be labeled from integer number 1 to 16 clockwise. If a set of N contiguous pixels in the circle are all brighter (or darker) by some threshold than the intensity of candidate pixel p, then pixel p may be classified as a keypoint.

In some embodiments, the keypoints may be associated with descriptors, which may be invariant to a range of image transformations such as translation, rotation, scaling, etc. The keypoint based representation facilitates the efficient matching of local features between images. In some embodiments, keypoints in an image frame may be identified and local descriptors corresponding to the individual keypoints may be built and used to track image features. For example, an object in a first reference image may be characterized by one or more keypoints or features, which may be stored in memory 160 or a database (not shown in FIG. 1) in memory 160. Keypoints or features extracted from a second subsequent image may then be used to identify an object in another image by a comparison with the stored keypoints from the first reference image.

In some embodiments, Scale Invariant Feature Transform (SIFT) techniques or variants thereof such as Rotation Invariant Feature Transform (RIFT), Gradient Location Oriented Histogram (GLOH), Principal Component Analysis-SIFT (PCA-SIFT), etc., may be used, in part, to identify features such as corner points, edges etc in an image frame. SIFT-based descriptors and variants thereof, which include a variety of computationally efficient modified SIFT descriptors, facilitate robust tracking and feature correspondence between images in the face of relatively large viewpoint changes. When SIFT based descriptors are used, for example, SIFT keys from a first reference image may matched with SIFT keys in the second subsequent image. In some embodiments, various other techniques may be used for feature detection. For example, techniques based on Speeded-Up Robust Features ("SURF"), or variants thereof, hybrid point and/or edge detection techniques, etc may be used for in part for feature detection with appropriate modifications as would be apparent to one of skill in the art.

To determine a match and/or a similarity score between a pair of image frames, keypoint descriptors in one image that correspond to keypoint descriptors in the other image may be determined, for example, based on a similarity in descriptor values (e.g., Euclidean distance (L-2 norm)) and similar relative geometric positions. In some embodiments, similarity may be determined, for example, using NCC, SSD, Sum of Absolute Differences (SAD), Canonical Correlation, and other correlation based image matching methods.

In some embodiments, any likely keypoint or descriptor (e.g. SIFT/SURF) identified in a first reference image may be assigned a "similarity score" or a "trackability score". The similarity score may provide a measure of similarity between a pair of images or, a pair of image sections. For example, a similarity score may be computed for an image patch around a keypoint and an image section in a region around the image patch. In some embodiments, the similarity score may be based on the similarity of the descriptor associated with the keypoint (as measured by a technique associated with the corresponding descriptor) to a local image section in the vicinity of the keypoint.

In some embodiments, the similarity score may be based, in part, on the maximum measured similarity of the image patch associated with a keypoint to a local image section in the vicinity of the keypoint. Further, in some embodiments, the trackability score for a keypoint may vary inversely (with high similarity implying a low trackability score and low similarity implying a high trackability score) in relation to the maximum measured similarity of the keypoint associated with an image patch to a local image section in a region around the image patch.

In some embodiments, a set of keypoints with the lowest similarity scores (or highest trackability scores) may be selected from among the candidate keypoints. The selected keypoints may be used to detect and/or track objects in subsequent images and/or to determine camera pose relative to the images. Further, repeatability and precision of keypoint extraction may be enhanced because of the distinctive nature of the selected keypoints.

In some embodiments, the tracking may be based on the same comparison method used when determining the similarity scores for a set of candidate keypoints. For example, if a cross-correlation based method (e.g. NCC, SSD, SAD, etc) is used to compare an image patch associated with a candidate keypoint to a corresponding local image section in the vicinity of the candidate keypoint to determine similarity scores for the candidate keypoint and obtain a selected subset of candidate keypoints then, the same (or similar) cross-correlation method may be used when tracking the selected subset of the candidate keypoints between images.

Not all functional units comprised in MS 100 have been shown in FIG. 1. Exemplary MS 100 may also be modified in various ways in a manner consistent with the disclosure, such as, by adding, combining, or omitting one or more of the functional blocks shown. For example, in some configurations, MS 100 may not include IMU 130, or Transceiver 170. Further, in certain example implementations, MS 100 may include a variety of other sensors (not shown) such as a depth sensor, stereoscopic sensors, an ambient light sensor, microphones, acoustic sensors, ultrasonic sensors, laser range finders, etc. In some embodiments, portions of MS 100 may take the form of one or more chipsets, and/or the like.

Processors 150 may be implemented using a combination of hardware, firmware, and software. Processors 150 may represent one or more circuits configurable to perform at least a portion of a computing procedure or process related to Computer Vision, 3D reconstruction, SLAM, tracking, image processing etc and may retrieve instructions and/or data from memory 160. Processors 150 may be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Memory 160 may be implemented within processors 150 and/or external to processors 150. As used herein the term "memory" refers to any type of long term, short term, volatile, nonvolatile, or other memory and is not to be limited to any particular type of memory or number of memories, or type of physical media upon which memory is stored. In some embodiments, memory 160 may hold program code that facilitates one or more of computer vision, image processing, performing SLAM, keypoint based detection and tracking, keypoint identification and selection, and other tasks performed by CV Module 155. In some embodiments, processor(s) 150 may comprise CV Module 155. For example, memory 160 may hold captured image frames and associated image data including keypoint descriptors, similarity and/or trackability scores associated with keypoints, depth information, processing results, etc. Memory 160 may also hold data provided by IMU 130 and other sensors. In general, memory 160 may represent any data storage mechanism. Memory 160 may include, for example, a primary memory and/or a secondary memory. Primary memory may include, for example, a random access memory, read only memory, etc. While illustrated in FIG. 1 as being separate from processors 150, it should be understood that all or part of a primary memory may be provided within or otherwise co-located and/or coupled to processors 150.

Secondary memory may include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory may be operatively receptive of, or otherwise configurable to couple to a non-transitory computer-readable medium in a removable media drive (not shown) coupled to MS 100. In some embodiments, non-transitory computer readable medium may form part of memory 160 and/or processor 150.

In some embodiments, CV module 155 may implement various computer vision methods and/or process images captured by camera 110. For example, CV module 155 may be capable of processing one or more images captured by camera 110 to perform: keypoint identification and selection, similarity or trackability scoring, and keypoint based detection and tracking in a manner consistent with disclosed embodiments. In some embodiments, CV module 155 may track the position of camera 110 based on keypoints in images captured using a monocular (single camera), for example, by using monocular Visual SLAM (VSLAM) techniques. CV Module 155 may also perform various other image processing and computer vision functions.

Figure 2A:
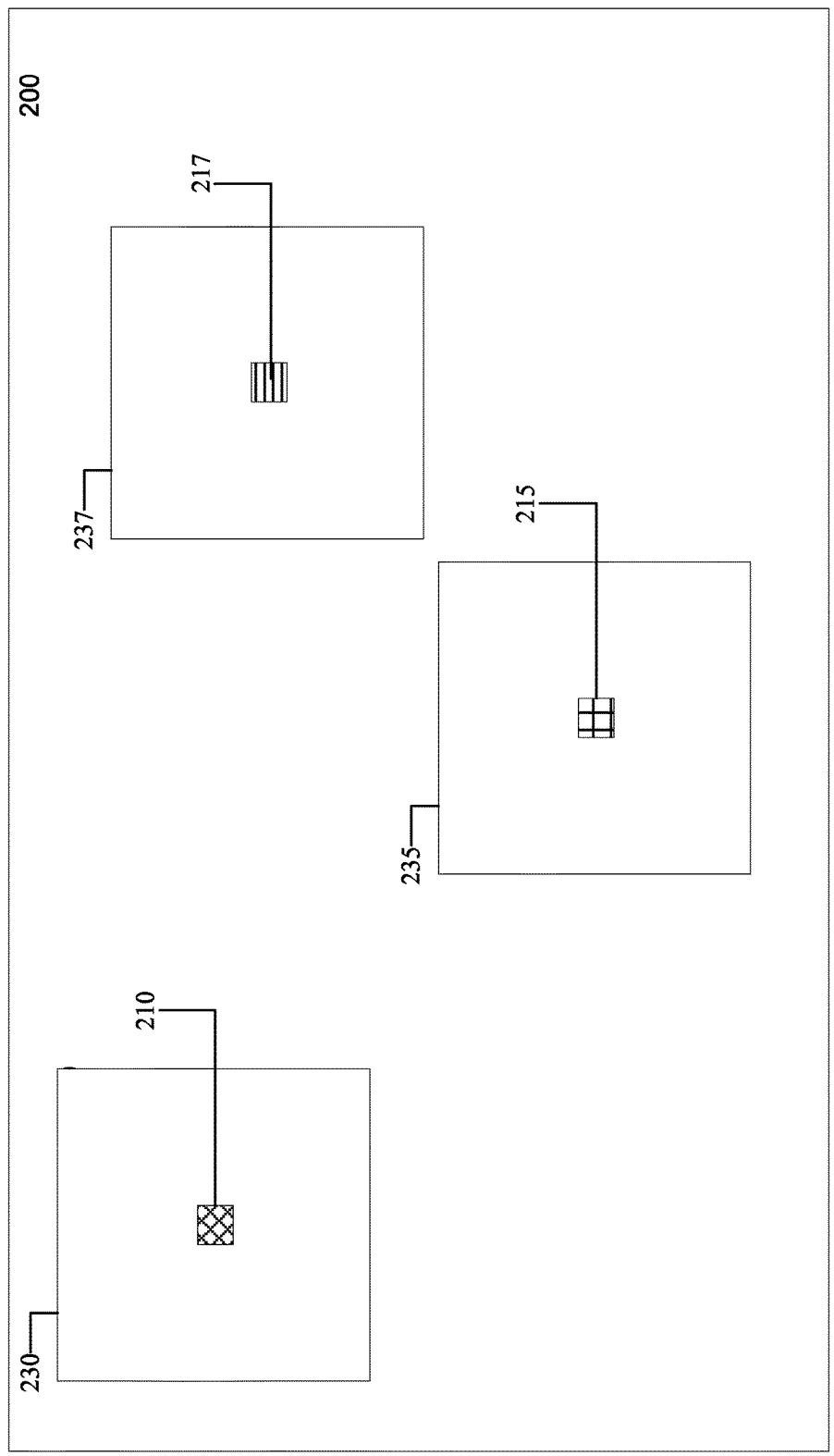
FIGS. 2A-2B show an image frame with an exemplary keypoint 210 and an associated image patch 220.
Figure 2B:
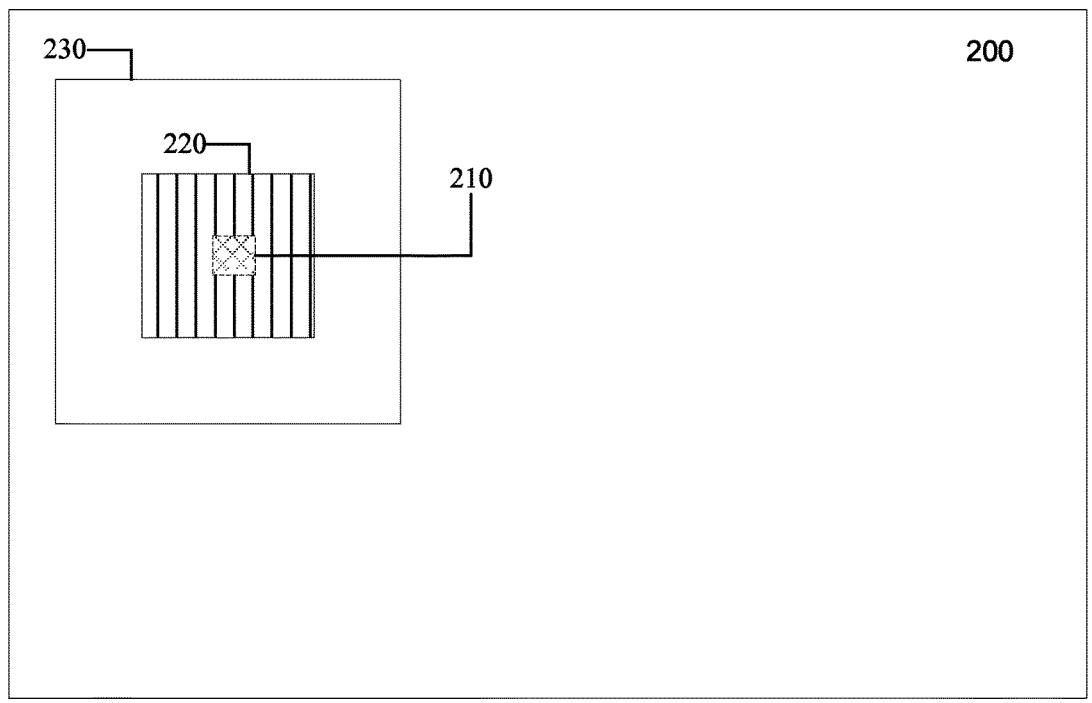

FIG. 2A shows an image frame 200 with an exemplary candidate keypoints 210, 215, and 217 in image regions 230, 235 and 237, respectively. As shown in FIG. 2A, an image frame may have several candidate keypoints. FIG. 2B shows an image patch 220 associated with keypoint 210 in image frame 200. In FIG. 2B, candidate keypoints 215 and 217 have not been shown. For example, image patch 220 may be a region of 5×5 pixels around keypoint 210. In some embodiments, an image descriptor such as SIFT, SURF, or variants thereof of the above may be used, at least in part, to represent the image patch 220. In some embodiments, the image patch 220 may be centered at the location of candidate keypoint 210. In general, the image patch may take on any shape (e.g. square, rectangle, polygon, circle etc).

In some embodiments, image region 230 may be a local image portion around image patch 220. Image sections in image region 230 may be matched and/or measured for similarity with image patch 220. The term "local" is used to refer to a portion of an image within some specified pixel distance from a keypoint (e.g. candidate keypoint 210) in the same image.

Figure 2C:
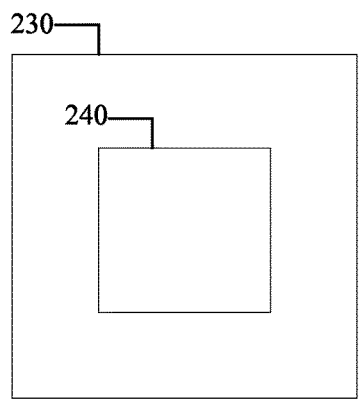
FIG. 2C shows image region 240 corresponding to the image patch in an image frame 230.

FIG. 2C shows image region 240 corresponding to image patch 220 in an image frame 230. In some embodiments, region 240 (which corresponds to the region associated with image patch 220) may be ignored during similarity determination because (by definition) image region 240 is similar to image patch 220.

Figure 2D:
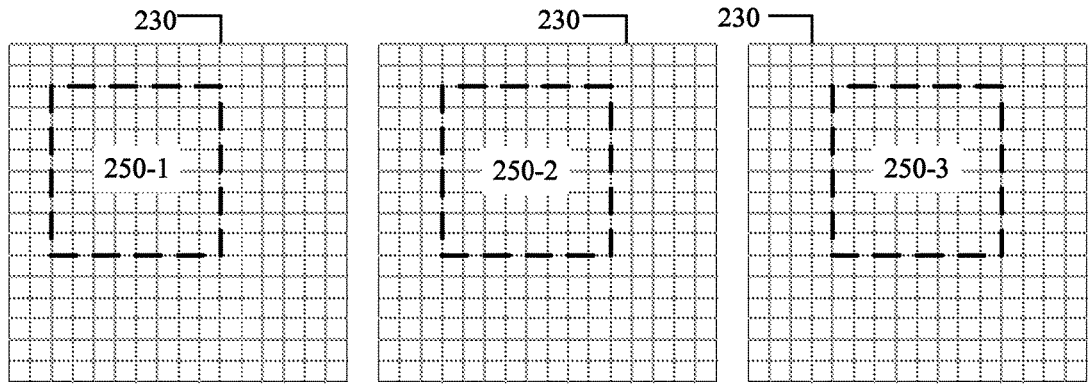
FIG. 2D illustrates exemplary local image sections 250-1, 250-2, 250-3, 260-1, 260-2 and 260-3, which may be compared with image patch 220 in image frame 230.
Figure 2D:
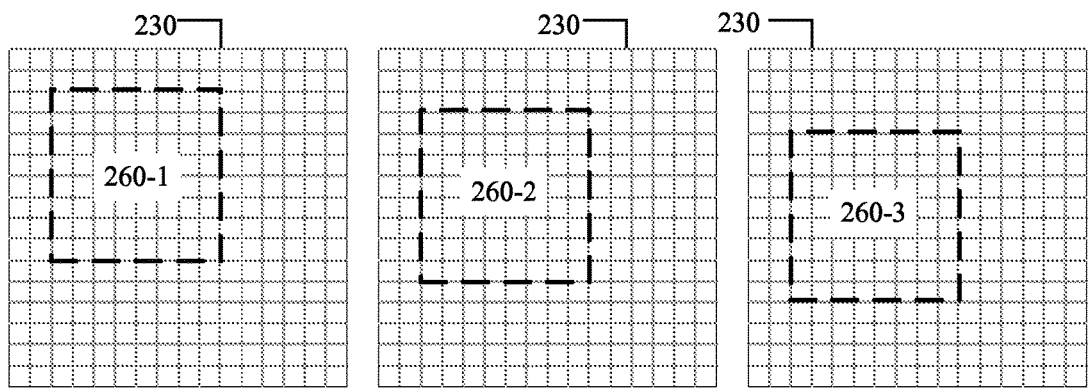

FIG. 2D illustrates exemplary image sections 250-1, 250-2, 250-3, 260-1, 260-2, and 260-3 which may be compared with image patch 220 in image region 230. As shown in FIG. 2D, image region 230 may include several image sections. Similarity scores may determined, for each pixel in image region 230, by matching or measuring a similarity between image patch 220 and an image section centered on the pixel and corresponding in size to image patch 220. For example, as shown in FIG. 2D, image patch 220 may be compared with image section 250-1 in image frame 230. After a similarity score has been determined for image section 250-1, image patch 220 may be compared with image section 250-2, which may be a section offset to the right by one pixel relative to region 250-1. After a similarity score has been determined for image section 250-2, image patch 220 may be compared with image section 250-3, which may be a section offset to the right by one pixel relative to section 250-2. The process may continue until a similarity score has been determined for pixels in image region 230. Image sections 250-1, 250-2 and 250-3 are offset horizontally by one pixel. However, as show in FIG. 2D, the image sections may also be offset vertically relative to one another, as shown by regions 260-1, 260-2 and 260-3. In general, variety of techniques or displacement patterns may be used to select the next pixel and image section (centered on the next pixel and corresponding in size to image patch 220) in image region 230 for comparison with image patch 230.

In instances where keypoint descriptors are used, to compute a match and/or a similarity score between a pair of image frames, keypoint descriptors in one image that correspond to keypoint descriptors in the other image may be determined, for example, based on a similarity in descriptor values (e.g., Euclidean distance (L-2 norm)) and similar relative geometric positions. In some embodiments, similarity may be determined, for example, using NCC, SSD, SAD, and other correlation based image matching methods.

In sum, an image frame may include several candidate keypoints (e.g. candidate keypoint 210). Each candidate keypoint (e.g. candidate keypoint 210) may be associated with a corresponding image patch (e.g. image patch 220). An image region (e.g. image region 230) may be a local image portion around the corresponding image patch (e.g. image patch 220). The image region (e.g. image region 230) may include several corresponding sections (e.g. image sections 250-1, 250-2, 250-3, 260-1, 260-2, and 260-3) where each image section is centered on a distinct pixel in the corresponding image region (e.g. image region 230). Further, each image section (e.g. image sections 250-1, 250-2, 250-3, 260-1, 260-2, and 260-3) may correspond in size to the image patch (e.g. image patch 220) in the corresponding image region (e.g. image region 230).

Figure 3A:
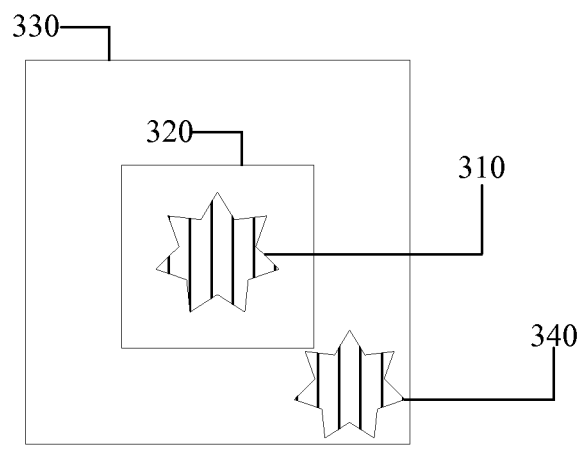
FIG. 3A shows an exemplary local image section in an image region around an image patch associated with a keypoint.

FIG. 3A shows an exemplary local image section 330 in an image region around an image patch 320 associated with a keypoint. Image patch 320 also includes pattern 310. As shown in FIG. 3A pattern 310 is similar to pattern 340, which also occurs in local image section 330.

Figure 3B:
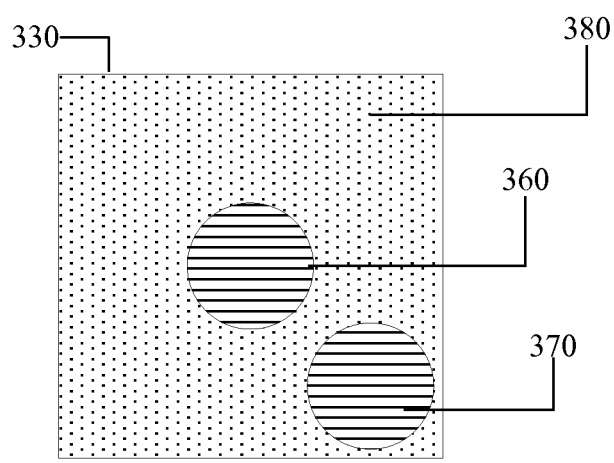
FIG. 3B is a graphical depiction of similarity obtained when image patch 320 is compared with local image section 330.

FIG. 3B is a graphical depiction of similarity obtained when image patch 320 is compared with local image section 330. In FIG. 3B, image region 370 in local image section 330 is similar to image patch 320 as shown by the horizontal lines. By definition, as outlined earlier, image region 360 is also similar to image patch 320. At locations 380 (shown by the shaded region) in local image section 330 that are outside of image regions 360 and 370, the similarity may be lower.

Figure 4A:
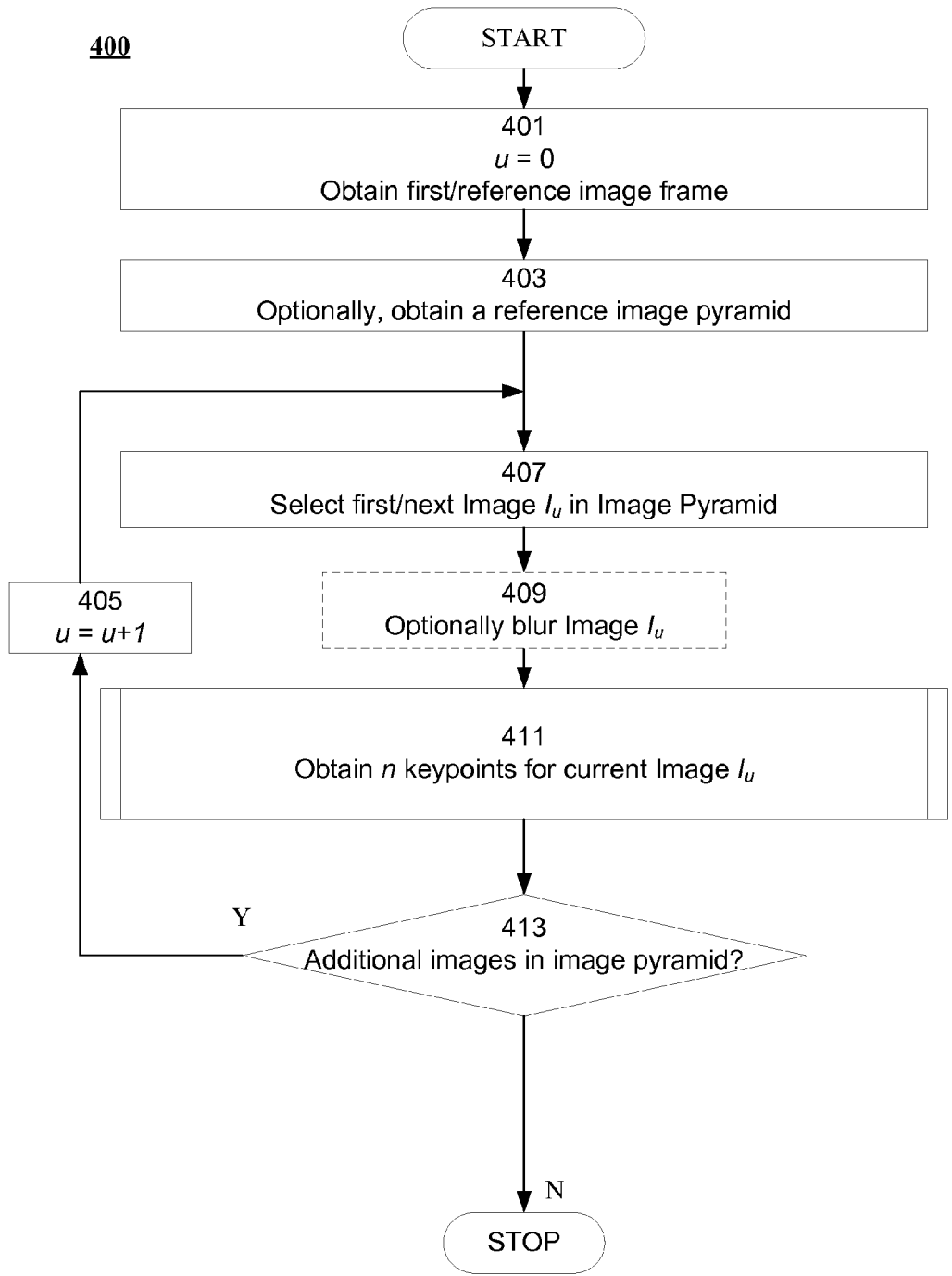
FIG. 4A shows a flowchart of an exemplary method 400 to determine keypoints from image levels in an image pyramid.

FIG. 4A shows a flowchart of an exemplary method 400 to determine keypoints from a set of candidate keypoints. In some embodiments, method 400 may be performed on MS 100 and/or another computing device such as a server, which may, in some instances, be communicatively coupled to MS 100. In some embodiments, method 400 may be performed, at least in part, by processor(s) 150 and/or CV module 155 based on images captured by camera 110.

After starting, in some embodiments, in block 401, a first or reference image frame may be captured and a counter u may be initialized to 0. A reference image may be any image determined as suitable for identifying keypoints and one that includes an adequate number of keypoints to facilitate subsequent tracking. In some embodiments, the first/reference image may be an image frame selected from a live video feed captured by camera(s) 110 on MS 100. In some embodiments, first/reference image frame may be captured at a first resolution based on camera settings.

In some embodiments, in block 403, a hierarchy of images may optionally be obtained from the first/reference image, where each image in the hierarchy of images may have a corresponding image resolution. For example, the captured first/reference image keyframe may be subsampled to obtain a hierarchy of images of differing resolutions that are associated with the first/reference image. The lower resolution images facilitate tracking in the event of large camera movements.

For example, the images of differing resolutions may be viewed as constituting a pyramid where each level of the pyramid includes images differing in resolution by some factor from an immediately higher or lower level of the image pyramid. For example, the highest level (level 0) of the pyramid may have the raw or highest resolution image (relative to the other images in the hierarchy/pyramid) and each level below may downsample the image relative to the level immediately above by some factor. For example, for an image $I_0$ of size 640×480 (at level 0), the images $I_1, I_2, I_3$ and $I_4$ may be of sizes 320×240, 160×120, 80×60 and 40×30, respectively, where the subscript indicates the image level in the image pyramid. Thus, each keypoint in an image in the image pyramid may be associated with: (i) its source frame (e.g. the captured first/reference image frame) (ii) one of the subsampled lower resolution images in the hierarchy associated with the source keyframe and (iii) a local location or image patch within the source or subsampled image keyframes. The hierarchy of images may be viewed as different resolution images of the same scene. In general, various other techniques may be used to obtain an image pyramid. For example, a lower resolution image at a first level in the image pyramid may be some mathematical function of a higher resolution image at a second level of the image pyramid, where the first and second levels are consecutive levels. In some embodiments, block 403 may be omitted.

In some embodiments, in block 407, the first or next image $I_u$ in the image pyramid may be selected. In block 409, the image $I_u$ may optionally be blurred. Blurring may be performed using various filters. For example, a Gaussian, average, or weighted average filter may be applied to the image. In some embodiments, blurring the image prior to the determination of keypoint may facilitate identification of salient features and increase tracking robustness when the keypoints are tracked. In some embodiments, block 409 may be omitted.

In some embodiments, routine 411 may then be invoked to determine a set of n keypoints for image $I_u$. For example, in some embodiments, the image $I_u$ may be passed as a parameter to routine 415 in FIG. 4B. Exemplary routine 411 is outlined further in the flowchart in FIG. 4B and described further below. Routine 411 may return a set of keypoints for image $I_u$, which may be stored. Thus, each invocation of routine 411 returns a set of some predefined number of (n)

keypoints for image $I_u$. Each subset of n keypoints returned by routine 411 corresponds to an image at a level in the image pyramid.

In block 413, if there are additional images in the image pyramid to be processed ("Y" in block 413), another iteration is commenced in block 405, where the counter u is incremented and the next image $I_u$ is processed. If there are no further images in the image pyramid, ("N" in block 413) then, the process terminates. Upon completion of method 400, a plurality of sets of keypoints may be determined, where each set corresponds to an image at a corresponding level in the image pyramid.

Figure 4B:
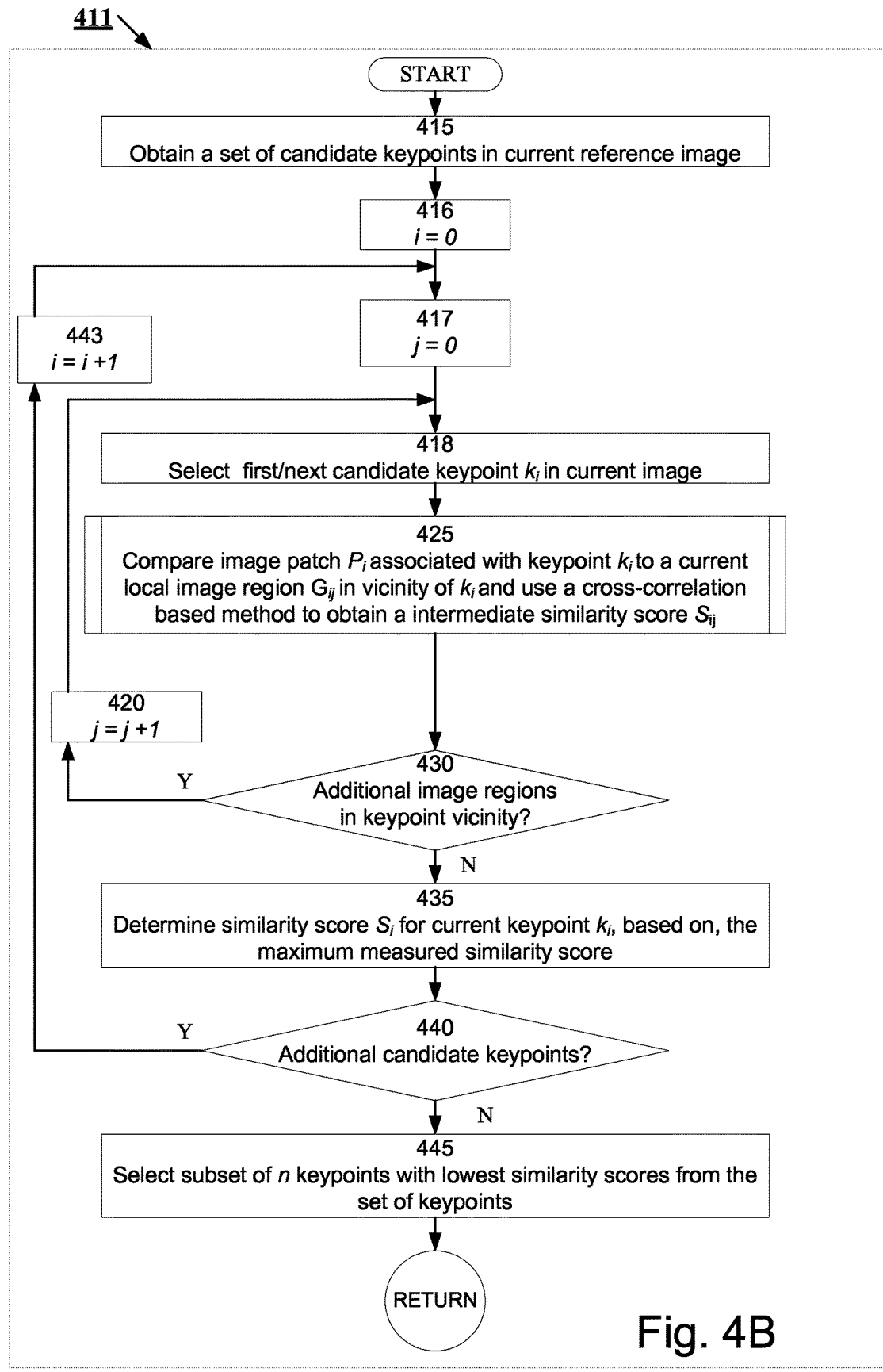
FIG. 4B shows a flowchart of an exemplary method 411 to select a subset of keypoints from a set of candidate keypoints.

FIG. 4B shows a flowchart of an exemplary method 411 to select a subset of keypoints for a single image $I_u$ from a set of candidate keypoints for $I_u$. In some embodiments, method 400 may be performed on MS 100 and/or another computing device such as a server, which may, in some instances, be communicatively coupled to MS 100. In some embodiments, method 400 may be performed, at least in part, by processor(s) 150 and/or CV module 155 based on images captured by camera 110.

In block 415, a set of candidate keypoints may be determined for the current reference image. In general, any known technique may be used to determine a set of candidate keypoints. For example, corner points (e.g. detected using Harris corner detection, DoG, etc) in the current image may be used. In some embodiments, techniques based on one of SIFT, SURF, or variants thereof may be used to determine a set of candidate keypoints.

In block 416, counter i, which may maintain a count of candidate keypoints $k_i$, may be initialized/set to 0. Next, in block 417, counter j, which may keep a track of the current image section $G_{ij}$ of local image sections in the vicinity of keypoint $k_i$, may be initialized/set to 0. In block 418, the first or next candidate keypoint $k_i$ may be selected.

In block 425, image patch $P_i$ associated with keypoint $k_i$ may be compared with a selected corresponding current local image section $G_{ij}$ in the vicinity of keypoint $k_i$, and a similarity score $S_{ij}$ may be determined based on the comparison. For example, referring to FIGS. 2B and 2D, if image patch $P_i$ corresponds to image patch 220 and current local image section $G_{ij}$ corresponds to image region 260-1, then, a similarity score may be determined based on the comparison of image patch 220 and image region 260-1. In some embodiments, the image region associated with image patch $P_i$ may be ignored during comparisons in block 425. For example, referring to FIGS. 2B and 2D, if image patch $P_i$ corresponds to image patch 220, then, image region 240, which is associated with image patch 220 may be ignored during comparisons. In general, to determine a match and/or a similarity score between an image patch and an image section, or between two image frames, keypoint descriptors in one image (patch or frame) that correspond to keypoint descriptors in the other image (section or frame, respectively) may be determined, for example, based on a similarity in descriptor values (e.g., Euclidean distance (L-2 norm)) and similar relative geometric positions. In some embodiments, similarity may be determined, for example, using one of NCC, SSD, SAD, Canonical Correlation, or other cross-correlation based image matching methods.

In block 430, if there are additional portions of the image section, which may be compared with image patch $P_i$ ("Y", in block 430), then, in block 420, the counter j is incremented and another iteration for next image section $G_{ij}$ is started. In some embodiments, similarity scores $S_{ij}$ computed by comparing each $G_{ij}$ with image patch $P_i$ may be stored in memory 160 in MS 100. For example, referring to FIGS. 2B and 2D, if image patch $P_i$ corresponds to image patch 220 and the next local image section $G_{ij}$ may correspond to image region 260-2, then, a similarity score may be determined based on the comparison of image patch 220 and image region 260-2.

In block 430, if there are no further portions $G_{ij}$ in the local image section to be compared with local image section ("N" in block 430), then, in block 435, a similarity score may be determined for the current keypoint $k_i$ based on a maximum of the measured similarity scores. In some embodiments, the maximum measured similarity score for keypoint $k_i$ may be determined as $S_{i\_max}=\max(S_{ij})$, where similarity scores $S_{ij}$ are computed by comparing each corresponding image section $G_{ij}$ with image patch $P_i$, where the image sections $G_{ij}$ are in a region around image patch $P_i$. In some embodiments, because image patch $P_i$ is similar to itself, the region occupied by image patch $P_i$ may be excluded when selecting image sections $G_{ij}$.

In some embodiments, the similarity score may be converted to a trackability score $T_i$. For example, the trackability score $T_i$ corresponding to keypoint $k_i$ may be determined so as to be inversely proportional to the maximum measured similarity score $S_{i\_max}$. For example, if $0 \leq S_{i\_max} \leq 1$, where 0 indicates no similarity and 1 indicates maximum similarity, then, in one embodiment, trackability score $T_i$ may be defined as $T_i=1-S_{i\_max}$. The equation above is merely exemplary and various other schemes to compute $T_i$ may be used in a manner consistent with disclosed embodiments.

In block 440, if there are additional keypoints ("Y" in block 440) then, in block 443 counter i is incremented and a new iteration for the next keypoint $k_i$ is begun.

In block 440, if there are no additional keypoints ("N" in block 440) then, in block 445, a subset $R_u$ of $n_u$ keypoints with the lowest similarity scores (or highest trackability scores) may be selected from the set of candidate keypoints $k_i$, where $n_u$ is a desired number of keypoints for image $I_u$. In some embodiments, keypoints in subset $R_u$ may be used to detect and track objects in subsequent image sequences.

In some embodiments, method 411 may be used to determine keypoints for an entire image. Further, the number of keypoints $n_u$ in each subset $R_u$ may vary based on response time and tracking accuracy desired and other image and system parameters. In some embodiments, because the number of keypoints selected from the set of candidate keypoints may be significantly lower than the number of candidate keypoint, tracking may be faster and less resource expensive (e.g. lower memory usage etc). Thus, disclosed embodiments may facilitate real time or near real-time Augmented Reality (AR) applications on mobile devices with limited computational resources and/or facilitate faster robust tracking thereby providing a seamless AR experience. In addition, the lower computational overhead over a sequence of image frames may provide power savings.

Figure 5:
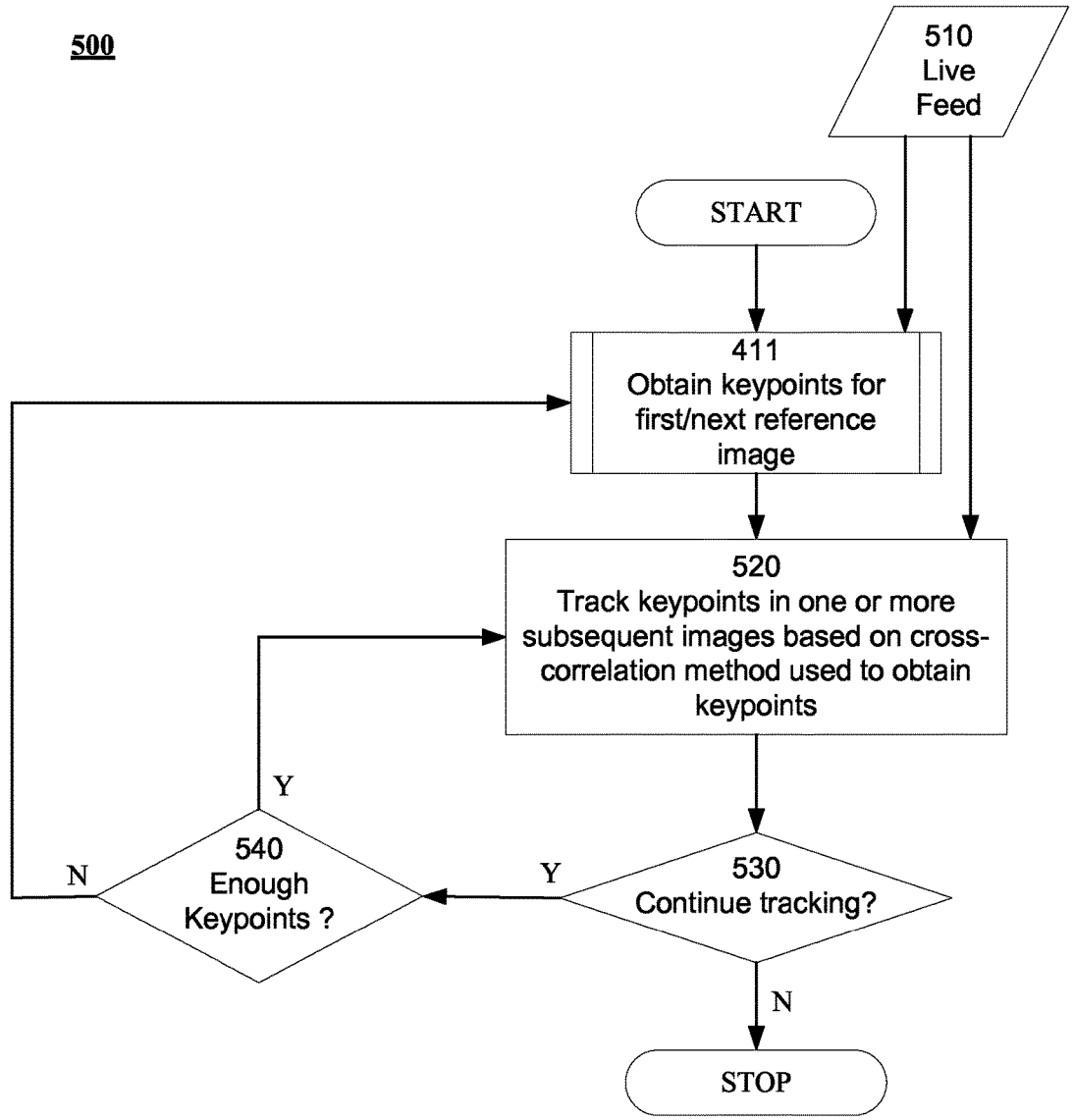
FIG. 5 shows a method 500 for tracking keypoints consistent with some disclosed embodiments.

FIG. 5 shows a method 500 for tracking keypoint consistent with some disclosed embodiments. In some embodiments, method 500 may be performed on MS 100 and/or another computing device such as a server, which may, in some instances, be communicatively coupled to MS 100. In some embodiments, method 500 may be performed, at least in part, by processor(s) 150 and/or CV module 155 based on images captured by camera(s) 110.

In some embodiments, method 500 may start by invoking method/routine 400 to determine a set of keypoints. In some embodiments, the keypoints may be determined for an image pyramid associated with a first reference image. In some embodiments, the first/reference image and other images may be obtained from live feed 510, such as, for example, image(s) captured by camera(s) 110 on MS 100.

In block 520, objects may be tracked in one or more subsequent images (subsequent to the first/reference image). In some embodiments, in block 520, the objects may be tracked between images based on the same cross-correlation scheme that was used in routine 411 to determine the similarity of an image patch associated with a keypoint with a region around the image patch.

In block 530, if tracking is to be continued ("Y" in block 530), then, in block 540, the number of keypoints available for tracking may determined. If there are enough keypoints available for tracking ("Y" in block 540), then another iteration may commence from block 520. On the other hand, if there is an insufficient number of keypoints ("N" in block 540), then another iteration may commence by returning to routine 411 to determine new/additional keypoints from the current or most recent image. For example, if the number of keypoint is less than some threshold, (e.g. as keypoints move out of the image frame due to relative motion between the camera and the imaged scene), then new keypoints may be determined in routine 411.

If tracking is complete ("N" in block 530) then the method may terminate.

Figure 6:
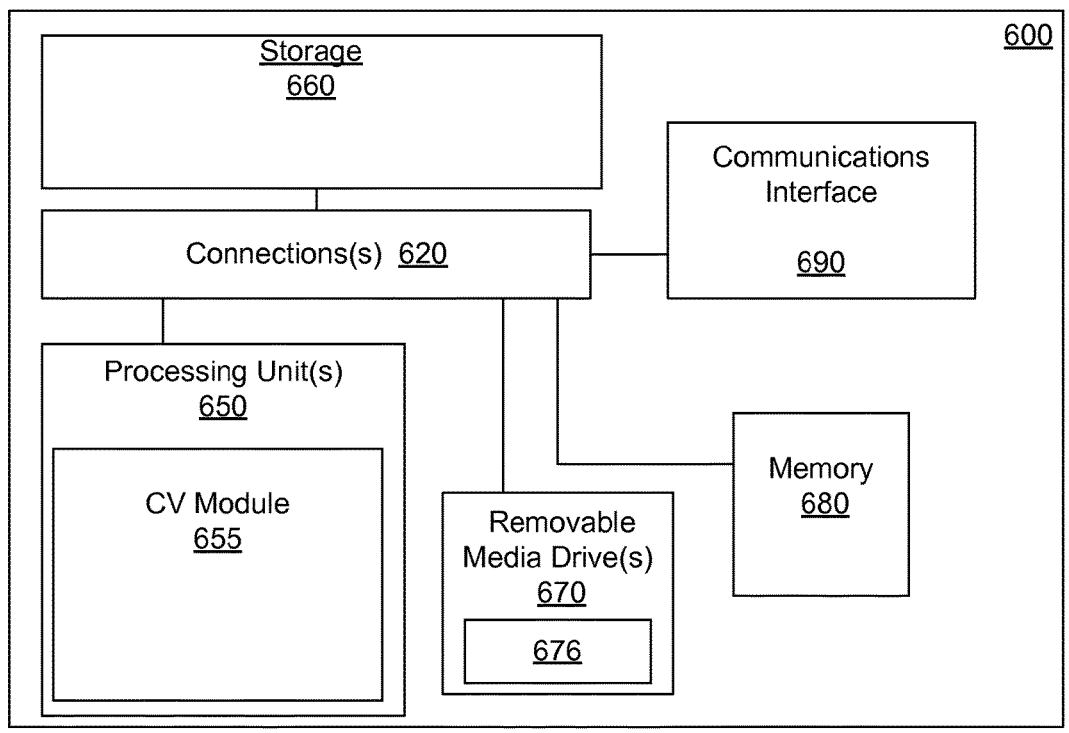
FIG. 6 shows a schematic block diagram illustrating a server 600 enabled to determine and track keypoints in an image in a manner consistent with disclosed embodiments.

Reference is now made to FIG. 6, which is a schematic block diagram illustrating a server 600 enabled to determine keypoint in an image in a manner consistent with disclosed embodiments. In some embodiments, server 600 may perform portions of methods 400 and/or 500. In some embodiments, method 400 and/or 500 may be performed by processing unit(s) 650 and/or Computer Vision (CV) module 655. For example, the above methods may be performed in whole or in part by processing unit(s) 650 and/or CV module 655 in conjunction with one or more functional units on server 600 and/or in conjunction with MS 100.

In some embodiments, server 600 may be wirelessly coupled to one or more MS' 100 over a wireless network (not shown), which may one of a WWAN, WLAN or WPAN. In some embodiments, server 600 may include, for example, one or more processing unit(s) 650, memory 680, storage 660, and (as applicable) communications interface 690 (e.g., wireline or wireless network interface), which may be operatively coupled with one or more connections 620 (e.g., buses, lines, fibers, links, etc.). In certain example implementations, some portion of server 600 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may include interfaces for communication with MS 100 and/or various other computers and peripherals. For example, in one embodiment, communications interface 690 may comprise network interface cards, input-output cards, chips and/or ASICs that implement one or more of the communication functions performed by server 600. In some embodiments, communications interface 690 may also interface with MS 100 to obtain a reference image, and/or receive data and/or instructions related to method 700.

Processing unit(s) 650 may use some or all of the received information to perform the requested computations and/or to send the requested information and/or results to MS 100 via communications interface 690. In some embodiments, processing unit(s) 650 may be implemented using a combination of hardware, firmware, and software. In some embodiments, processing unit(s) 650 may represent one or more circuits configurable to perform at least a portion of a data signal computing procedure or process related to the operation of server 600.

In some embodiments, processing unit(s) 650 may include Computer Vision (CV) Module 655, which may implement and execute computer vision methods, including AR procedures, obtaining/determining reference images, performing image processing, determining/detecting keypoints in a reference image, tracking keypoints, comparing images or image portions, obtaining image pyramids from a reference image, tracking objects in images etc. For example, CV module 655 may be capable of processing one or more images captured by a camera to perform: keypoint identification and selection, trackability scoring, and keypoint based detection and tracking in a manner consistent with disclosed embodiments. In some embodiments, CV module 655 may determine the position of a camera based on keypoints in images captured using a monocular (single camera), for example, by using Visual SLAM (VSLAM) techniques. CV Module 155 may also perform various other image processing and computer vision functions.

The methodologies described herein in flow charts and message flows may be implemented by various means depending upon the application. For example, these methodologies may be implemented in hardware, firmware, software, or any combination thereof. For a hardware implementation, the processing unit 650 may be implemented within one or more application specific integrated circuits (ASICs), digital signal processors (DSPs), digital signal processing devices (DSPDs), graphical processing units (GPUs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using procedures, functions, microcode, and so on that perform the functions described herein. Any machine-readable medium tangibly embodying instructions may be used in implementing the methodologies described herein. For example, software may be stored in removable media drive 670, which may support the use of non-transitory computer-readable media 676, including removable media. Program code may be resident on non-transitory computer readable media 676 or memory 680 and may be read and executed by processing units 650. Memory may be implemented within processing units 650 or external to the processing units 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 676 and/or memory 680. Examples include computer-readable media encoded with a data structure and computer-readable media encoded with a computer program. For example, non transitory computer-readable medium 676 including program code stored thereon may include program code to facilitate keypoint determination/selection in one or more images and keypoint based detection and tracking in a manner consistent with disclosed embodiments.

Non-transitory computer-readable media may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 690, which may store the instructions/data in memory 680, storage 660 and/or relayed the instructions/data to processing unit(s) 650 for execution. For example, communications interface 690 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 680 may represent any data storage mechanism. Memory 680 may include, for example, a primary memory and/or a secondary memory. Primary memory may include, for example, a random access memory, read only memory, non-volatile RAM, etc. While illustrated in this example as being separate from processing unit(s) 650, it should be understood that all or part of a primary memory may be provided within or otherwise co-located/coupled with processing unit(s) 650. Secondary memory may include, for example, the same or similar type of memory as primary memory and/or storage 660 such as one or more data storage devices 660 including, for example, hard disk drives, optical disc drives, tape drives, a solid state memory drive, etc.

In some embodiments, storage 660 may comprise one or more databases that may hold information pertaining to a scene, including 3D models, keyframes, information pertaining to virtual objects, etc. In some embodiments, information in the databases may be read, used and/or updated by processing unit(s) 650 during various computations.

In certain implementations, secondary memory may be operatively receptive of, or otherwise configurable to couple to a non-transitory computer-readable medium 676. As such, in certain example implementations, the methods and/or apparatuses presented herein may be implemented in whole or in part using non-transitory computer readable medium 676 that may include with computer implementable instructions stored thereon, which if executed by at least one processing unit(s) 650 may be operatively enabled to perform all or portions of the example operations as described herein. In some embodiments, computer readable medium 676 may be read using removable media drive 670 and/or may form part of memory 680.

For example, software code may be stored in a memory and executed by a processor unit such as processor(s) 650 on server 600. In some embodiments, the functions may be stored as one or more instructions or code on a computer-readable medium. Examples include computer-readable media encoded with a data structure and computer-readable media encoded with a computer program. Computer-readable media includes physical computer storage media.

A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 7:
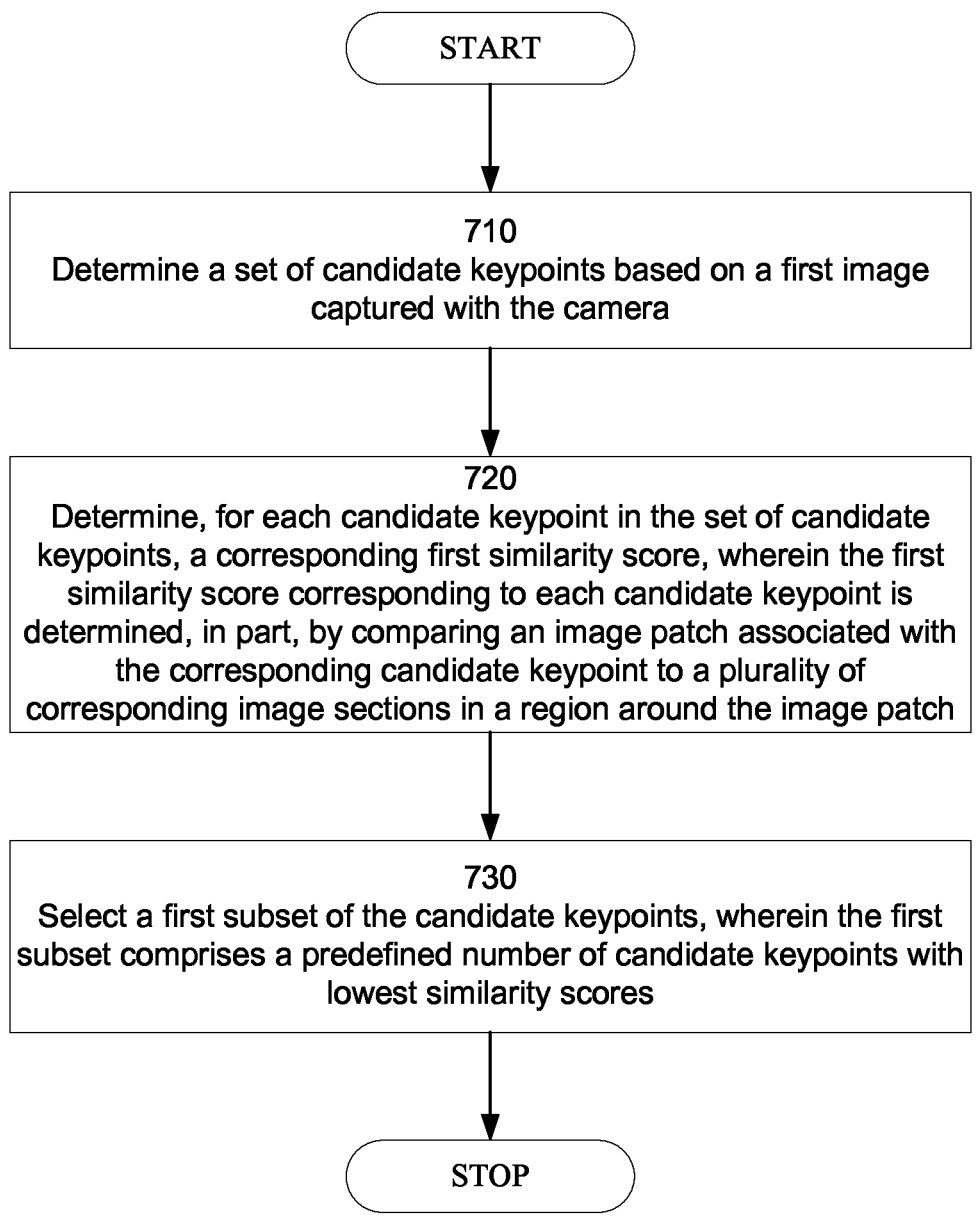
FIG. 7 shows an exemplary method 700 to determine keypoints for a first or reference image captured by a camera.

FIG. 7 shows an exemplary method 700 to determine keypoints for a first or reference image captured by a camera. In some embodiments, method 700 may be performed by MS 100 and/or server 100. In some embodiments, method 700 may be performed solely on MS 100. As one example, method 700 may be performed on MS 100, by server 600 based on images obtained by or available to server 600. In some embodiments, images captured by MS 100 may be sent to server 600 for processing, which may return results, such as a set of keypoints, to MS 100.

In block 710, a set of candidate keypoints based on a first image captured with the camera may be determined. In some embodiments, determining the set of candidate keypoints based on the first image may comprise: obtaining, from the first image, a hierarchy of images, wherein each image in the hierarchy of images has a corresponding image resolution. In some embodiments, one or more images in the hierarchy of images may be blurred when the images are obtained. Further, in embodiments where a hierarchy of images is obtained from the first image, a plurality of second subsets of candidate keypoints may be obtained, wherein each second subset of candidate keypoints is associated with a distinct image in the hierarchy of images, and wherein, the set of candidate keypoints comprises the plurality of second subsets.

In block 720, for each candidate keypoint in the set of candidate keypoints, a corresponding first similarity score may be determined. The first similarity score corresponding to a candidate keypoint may be determined, in part, by comparing an image patch associated with the corresponding candidate keypoint to a plurality of corresponding image sections in a region around the image patch.

In some embodiments, to determine the first similarity score corresponding to each candidate keypoint, a plurality of second similarity scores corresponding to each candidate keypoint may be determined. Each second similarity score may be determined from the comparison of the image patch associated with the corresponding candidate keypoint with one of the corresponding plurality of image sections in the region around the image patch, and each second similarity score may be indicative of a similarity between the image patch associated with the corresponding candidate keypoint and the corresponding image section. The first similarity score for the candidate keypoint may then be selected as the maximum of the second similarity scores for that candidate keypoint.

In some embodiments, to determine the plurality of second similarity scores corresponding to each candidate keypoint, each of the plurality of second similarity scores corresponding to a candidate keypoint may be computed based, at least in part, on a measure of cross correlation between the image patch associated with the candidate keypoint and the corresponding image section. For example, the measure of cross-correlation may be obtained based, in part, by performing cross-correlation selected from one of: Normalized Cross-Correlation; or Sum of Squared Differences; or Canonical Correlation Analysis.

In some embodiments, the selected keypoints may also be tracked based on the selected cross-correlation in at least one second image.

In block 730, a first subset of the candidate keypoints may be selected, wherein the first subset may comprise a predefined number of candidate keypoints with lowest similarity scores. As one example, if some predefined number n of keypoints is desired, then, the first subset may comprise keypoints with the n lowest similarity scores. As another example, the first subset may comprise all keypoints with a similarity score below some threshold score. In the example above, if some predefined number n of keypoints is desired and the number of candidate keypoints with a similarity score below the threshold is (n+p), then "p" candidate keypoints with the highest similarity scores may be removed to obtain n keypoints. On the other hand, if the number of keypoints with a similarity score below the threshold is (n−p), then "p" candidate keypoints with the lowest similarity scores of the remaining candidate keypoints may be added to obtain n keypoints. The predefined number of keypoints may vary with image level in the image pyramid, and may also be varied based on system parameters such as response time, tracking accuracy, environmental conditions etc.

In some embodiments, the image patch may be represented using an image descriptor. For example, the image descriptor may comprise one of: Scale Invariant Feature Transform (SIFT) or variants thereof; or Speeded-Up Robust Features ("SURF"), or variants thereof. In some embodiments, when the image patch is represented using an image descriptor, the first similarity score corresponding to the candidate keypoint may be obtained based, in part, on a similarity of the image descriptor associated with the image patch to one or more image descriptors in the region around the image patch, wherein each of the one or more image descriptors corresponds to a distinct image section in the region around the image patch. The similarity of the image descriptors may be determined based on techniques specified for determining similarity for the descriptors used to represent the image patch.

Further, in some embodiments, method 700 may further comprise tracking the first subset of keypoints in at least one second image captured by the camera.

The methodologies described herein may be implemented by various means depending upon the application. For example, for a firmware and/or software implementation, the methodologies may be implemented using procedures, functions, and so on that perform the functions described herein. Any machine-readable medium tangibly embodying instructions may be used in implementing the methodologies described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method comprising:
    determining a set of candidate keypoints based on a first image captured with a camera;
    determining, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in the first image in a region around the image patch; and
    selecting a first subset of the candidate keypoints, wherein the first subset comprises a predefined number of candidate keypoints with lowest similarity scores.

2. The method of claim 1, wherein determining the first similarity score corresponding to each candidate keypoint comprises:
    determining a plurality of second similarity scores corresponding to each candidate keypoint, wherein each second similarity score is determined from a comparison of the image patch associated with the corresponding candidate keypoint with one of the plurality of corresponding image sections in the region around the image patch, and wherein each second similarity score is indicative of a similarity between the image patch associated with the corresponding candidate keypoint and the corresponding image section; and
    selecting, as the first similarity score, a maximum of the second similarity scores for that candidate keypoint.

3. The method of claim 2, wherein determining the plurality of second similarity scores corresponding to each candidate keypoint comprises:
    computing each of the plurality of second similarity scores based, at least in part, on a measure of cross-correlation between the image patch associated with the candidate keypoint and the corresponding image section.

4. The method of claim 3, wherein the measure of cross-correlation is determined based, in part, by performing cross-correlation based on a cross-correlation method selected from one of:
    Normalized Cross-Correlation; or
    Sum of Squared Differences; or
    Sum of Absolute Differences.

5. The method of claim 4, further comprising:
    tracking, based on the selected cross-correlation, an object in at least one second image captured by the camera, based, in part, on the selected first subset of candidate keypoints.

6. The method of claim 1, wherein the image patch associated with the candidate keypoint is represented using an image descriptor.

7. The method of claim 6, wherein the image descriptor comprises one of:

Scale Invariant Feature Transform (SIFT) or variants thereof; or

Speeded-Up Robust Features ("SURF"), or variants thereof.

8. The method of claim 6, wherein the first similarity score corresponding to the candidate keypoint is determined based, in part, on a similarity of the image descriptor associated with the image patch to a plurality of image descriptors in the region around the image patch, wherein each of the plurality of image descriptors corresponds to a distinct image section in the region around the image patch.

9. The method of claim 1, further comprising:
tracking one or more objects in at least one second image captured by the camera, based, in part, on the first subset of candidate keypoints.

10. The method of claim 1, wherein determining the set of candidate keypoints based on the first image comprises:
obtaining, from the first image, a hierarchy of images, wherein each image in the hierarchy of images has a corresponding image resolution; and
determining a plurality of second subsets of candidate keypoints, wherein each second subset of candidate keypoints is associated with a distinct image in the hierarchy of images, and wherein, the set of candidate keypoints comprises the plurality of second subsets of candidate keypoints.

11. The method of claim 10, wherein obtaining, from the first image, a hierarchy of images comprises:
blurring one or more images in the hierarchy of images.

12. A Mobile Station (MS) comprising:
a camera to capture a plurality of images comprising a first image;
a memory to store the plurality of images; and
a processor coupled to the camera and the memory, wherein the processor is configured to
determine a set of candidate keypoints based on the first image captured with a camera;
determine, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in the first image in a region around the image patch; and
select a first subset of the candidate keypoints, wherein the first subset comprises a predefined number of candidate keypoints with lowest similarity scores.

13. The MS of claim 12, wherein to determine the first similarity score corresponding to each candidate keypoint, the processor is configured to:
determine a plurality of second similarity scores corresponding to each candidate keypoint, wherein each second similarity score is determined from a comparison of the image patch associated with the corresponding candidate keypoint with one of the plurality of corresponding image sections in the region around the image patch, and wherein each second similarity score is indicative of a similarity between the image patch associated with the corresponding candidate keypoint and the corresponding image section; and
select, as the first similarity score, a maximum of the second similarity scores for that candidate keypoint.

14. The MS of claim 13, wherein to determine the plurality of second similarity scores corresponding to each candidate keypoint, the processor is configured to:
compute each of the plurality of second similarity scores based, at least in part, on a measure of cross-correlation between the image patch associated with the candidate keypoint and the corresponding image section.

15. The MS of claim 14, wherein to determine the measure of cross-correlation, the processor is configured to:
perform cross-correlation based on a cross-correlation method selected from one of:
Normalized Cross-Correlation; or
Sum of Squared Differences; or
Sum of Absolute Differences.

16. The MS of claim 15, wherein the processor is further configured to:
track, based on the selected cross-correlation, an object in at least one second image captured by the camera, based, in part, on the selected first subset of candidate keypoints.

17. The MS of claim 12, wherein the image patch associated with the candidate keypoint is represented using an image descriptor.

18. The MS of claim 17, wherein the image descriptor comprises one of:
Scale Invariant Feature Transform (SIFT) or variants thereof; or
Speeded-Up Robust Features ("SURF"), or variants thereof.

19. The MS of claim 17, wherein the first similarity score corresponding to the candidate keypoint is determined based, in part, on a similarity of the image descriptor associated with the image patch to a plurality of image descriptors in the region around the image patch, wherein each of the plurality of image descriptors corresponds to a distinct image section in the region around the image patch.

20. The MS of claim 12, wherein to determine the set of candidate keypoints based on the first image, the processor is configured to:
obtain, from the first image, a hierarchy of images, wherein each image in the hierarchy of images has a corresponding image resolution; and
determine a plurality of second subsets of candidate keypoints, wherein each second subset of candidate keypoints is associated with a distinct image in the hierarchy of images, and wherein, the set of candidate keypoints comprises the plurality of second subsets of candidate keypoints.

21. The MS of claim 20, wherein to obtain, from the first image, a hierarchy of images, the processor is configured to:
blur one or more images in the hierarchy of images.

22. The MS of claim 12, wherein the processor is further configured to:
track an object in at least one second image captured by the camera, based, in part, on the first subset of candidate keypoints.

23. An apparatus comprising:
image sensing means to capture a plurality of images comprising a first image;
means for determining a set of candidate keypoints based on a first image captured by an image sensing means;
means for determining, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in the first image in a region around the image patch; and means for selecting a first subset of the candidate keypoints, wherein the first subset comprises a predefined number of candidate keypoints with lowest similarity scores.

24. The apparatus of claim 23, wherein means for determining the first similarity score corresponding to each candidate keypoint comprises:
  means for determining a plurality of second similarity scores corresponding to each candidate keypoint, wherein each second similarity score is determined from a comparison of the image patch associated with the corresponding candidate keypoint with one of the plurality of corresponding image sections in the region around the image patch, and wherein each second similarity score is indicative of a similarity between the image patch associated with the corresponding candidate keypoint and the corresponding image section; and
  means for selecting, as the first similarity score, a maximum of the second similarity scores for that candidate keypoint.

25. The apparatus of claim 23, wherein means for determining the plurality of second similarity scores corresponding to each candidate keypoint comprises:
  means for computing each of the plurality of second similarity scores based, at least in part, on a measure of cross-correlation between the image patch associated with the candidate keypoint and the corresponding image section, wherein the measure of cross-correlation is determined based, in part, by performing a cross-correlation selected from one of:
  Normalized Cross-Correlation; or
  Sum of Squared Differences; or
  Sum of Absolute Differences.

26. A non-transitory computer-readable medium comprising instructions, which when executed by a processor, cause the processor to perform steps in a method comprising:
  determining a set of candidate keypoints based on a first image captured with a camera;
  determining, for each candidate keypoint in the set of candidate keypoints, a corresponding first similarity score, wherein the first similarity score corresponding to each candidate keypoint is determined, in part, by comparing an image patch associated with the corresponding candidate keypoint to a plurality of corresponding image sections in the first image in a region around the image patch; and
  selecting a first subset of the candidate keypoints, wherein the first subset comprises a predefined number of candidate keypoints with lowest similarity scores.

27. The computer-readable medium of claim 26, wherein determining the first similarity score corresponding to each candidate keypoint comprises:
  determining a plurality of second similarity scores corresponding to each candidate keypoint, wherein each second similarity score is determined from a comparison of the image patch associated with the corresponding candidate keypoint with one of the plurality of corresponding image sections in the region around the image patch, and wherein each second similarity score is indicative of a similarity between the image patch associated with the corresponding candidate keypoint and the corresponding image section; and
  selecting, as the first similarity score, a maximum of the second similarity scores for that candidate keypoint.

28. The computer-readable medium of claim 27, wherein determining the plurality of second similarity scores corresponding to each candidate keypoint comprises:
  computing each of the plurality of second similarity scores based, at least in part, on a measure of cross-correlation between the image patch associated with the candidate keypoint and the corresponding image section.

29. The computer-readable medium of claim 28, wherein the measure of cross-correlation is determined based, in part, by performing a cross-correlation method selected from one of:
  Normalized Cross-Correlation; or
  Sum of Squared Differences; or
  Sum of Absolute Differences.

30. The computer-readable medium of claim 26, wherein determining the set of candidate keypoints based on the first image comprises:
  obtaining, from the first image, a hierarchy of images, wherein each image in the hierarchy of images has a corresponding image resolution; and
  determining a plurality of second subsets of candidate keypoints, wherein each second subset of candidate keypoints is associated with a distinct image in the hierarchy of images, and wherein, the set of candidate keypoints comprises the plurality of second subsets of candidate keypoints.

* * * * *